United States Patent [19]
Crescentini et al.

[11] 3,873,639
[45] Mar. 25, 1975

[54] ANTISTATIC FIBER CONTAINING CHAIN-EXTENDED TETROLS BASED ON DIAMINES

[75] Inventors: Lamberto Crescentini; Rodney Lee Wells, both of Chester, Va.

[73] Assignee: Allied Chemical Corporation, Morristown, N.J.

[22] Filed: July 12, 1972

[21] Appl. No.: 271,316

[52] U.S. Cl. 260/857 PG, 260/45.85 B, 260/45.85 P, 260/75 N, 260/77.5 AM, 260/77.5 AQ, 260/78 SC, 260/830 P
[51] Int. Cl. ............................................. C08g 41/04
[58] Field of Search . 260/857 PG, 45.85 B, 45.85 P

[56] References Cited
UNITED STATES PATENTS

| | | | |
|---|---|---|---|
| 3,285,855 | 11/1966 | Dexter | 260/45.85 S |
| 3,330,859 | 7/1967 | Dexter | 260/45.85 B |
| 3,364,250 | 1/1968 | Dexter | 260/45.85 B |
| 3,594,448 | 7/1971 | Birenzvige | 260/45.85 B |
| 3,644,482 | 2/1972 | Dexter | 260/45.85 B |
| 3,657,386 | 4/1972 | Weedon | 260/857 PG |
| 3,723,489 | 3/1973 | Dexter | 260/45.85 B |
| 3,723,503 | 3/1973 | Dexter | 260/45.85 B |

*Primary Examiner*—Paul Lieberman
*Attorney, Agent, or Firm*—Fred L. Kelly

[57] ABSTRACT

A antistatic properties of fibers of polyamide could be improved by dispersing in the polyamide a small proportion of a reaction product of a tetrol compound represented by the formula:

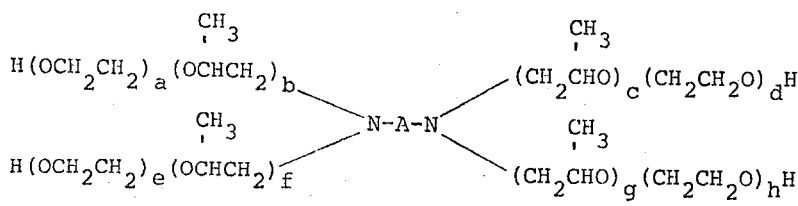

and at least one compound selected from the group consisting of diepoxides and compounds which yield the following divalent radicals:

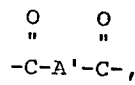

and

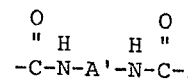

an additional small proportion of a hindered phenol represented by the formulae:

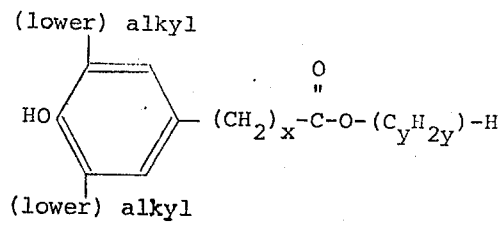

in which $x$ has a value of from 1 to 6 and $y$ has a value of from 6 to 30; and

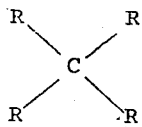

in which R is

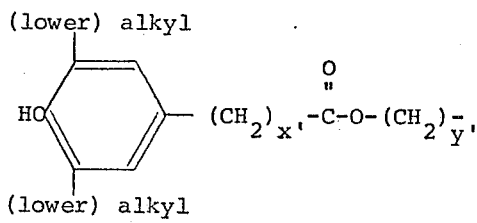

wherein $x'$ has a value from 1 to 6 and $y'$ has a value of 1 to 6 is added.

10 Claims, No Drawings

ANTISTATIC FIBER CONTAINING CHAIN-EXTENDED TETROLS BASED ON DIAMINES

CROSS-REFERENCE TO RELATED APPLICATION

This application is directed to an improvement upon the invention disclosed in U.S. application Ser. No. 239,905, filed Mar. 31, 1972, now abandoned. U.S. application Ser. No. 239,905 is hereby incorporated by reference into this application.

BACKGROUND OF THE INVENTION

This invention relates to a process for the meltspinning of a filamentary structure from a synthetic polyamide polymer. More particularly, it is concerned with an improved process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. More specifically, it is disclosed in U.S. Pat. No. 3,475,898 to Magat and Sharkey to use poly(ethylenepropylene) ether glycols for this purpose. More recently, U.S. Pat. No. 3,657,386 discloses that certain propylene oxideethylene oxide copolymers based on ethylene diamine are useful in preparation of an antistatic fiber of polyamide. It has also been suggested that the utility of synthetic fiber of polyamide could be increased by dispersing in the polyamide an antistatic compound which is a reaction product of:

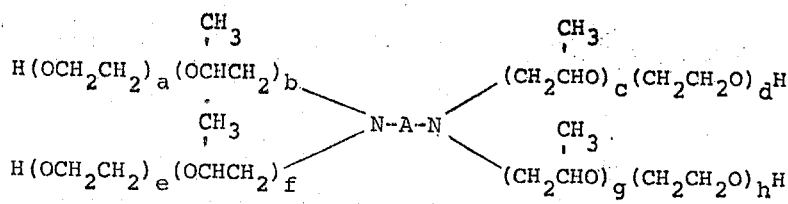

where $a$, $b$, $c$, $d$, $e$, $f$, $g$, and $h$ are each a whole number and A is a difuntional radical from a hydrocarbon containing 1 to 13 carbon atoms, said tetrol compound having a molecular weight between about 4,000 and about 50,000, and at least one compound selected from the group consisting of diepoxides and compounds which yield the following divalent radicals:

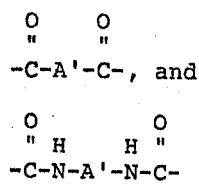

where A' is a difunctional radical from a hydrocarbon containing 1 to 30 carbon atoms. However, with use of this antistatic agent, serious problems were encountered in meltspinning due to the frequent occurrence of "nubs" in the fiber. The term "nubs" is conventionally applied and is used herein to mean enlarged selections of filament no more than several filament dimeters in length. Nubs may be formed by a foreign, non-orientable substance which interferes with normal fiber stretch in a short section, resulting in an enlargement. Foreign substances which are believed to have contributed to nubs in the present instance include carbonized polymer from face of extruder die and spinnerette, and gels formed in the polymer. Gels appear to be the chief cause, i.e., the nubs are probably created by non-orientable gel from cross-linked polymer. Thermal degradation of the polymer may be an important causative factor.

The reactions in thermal degradation of polyamides containing polyalkylene ether additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the reactor and other equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later cold drawn, these defects may cause breaks in the filaments which either cause the whole thread to break or else form nubs which go throught to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer, in particular to minimize nub formation in the filaments. Other objects will become apparent from the disclosure and the appended claims.

These objects are accomplished by the present invention which provides an improvement in the process for the formation of an antistatic polyamide fiber from a fiber-forming polyamide polymer containing about 1 percent to 12 percent by weight of an antistatic compound which is a reaction product of a tetrol compound represented by the formula:

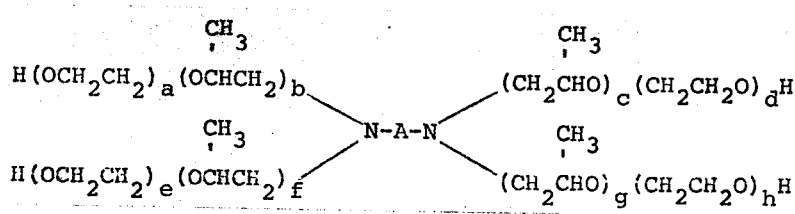

where $a, b, c, d, e, f, g$, and $h$ are each a whole number and A is a difunctional radical from a hydrocarbon containing 1 to 13 carbon atoms, said tetrol compound having a molecular weight between about 4,000 and about 50,000 and at least one compound selected from the group consisting of diepoxides and compounds which yield the following divalent radicals:

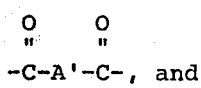

and

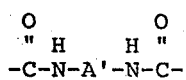

where A' is a difunctional radical from a hydrocarbon containing 1 to 30 carbon atoms, by extruding the molten polymer through an orifice into a quenching medium and thereafter stretching the resulting filaments, the improvement comprising dissolving in the extrudate prior to extrusion at least 0.1 percent by weight, preferably 0.5 to 8 percent, based on the weight of the antistatic compound, of a phenol of the formulae:

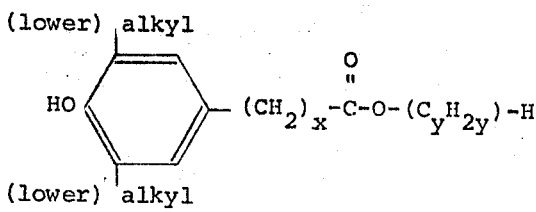

in which $x$ has a value of from 1 to 6 and $y$ has a value of from 6 to 30; and

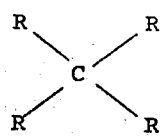

in which R is

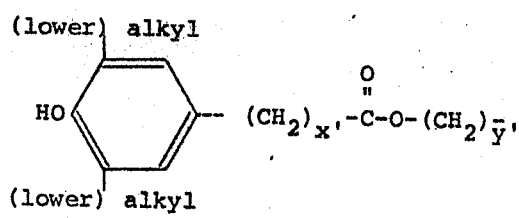

wherein $x'$ has a value from 1 to 6 and $y'$ has a value of 1 to 6.

When the term "alkyl" is qualified by the designation "(lower)," there is intended a branched or straight chain hydrocarbon of from 1 to about 6 carbon atoms.

Preferably, the phenol compound is used with at least 0.1% by weight, based on the weight of the antistatic additive, of a sulfur compound of the formula:

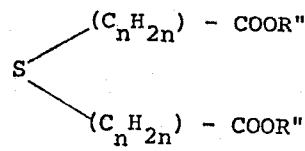

wherein R'' is an alkyl radical containing 8 to 18 carbon atoms and $n$ is 1 to 3.

As stated above, the present invention is an improvement upon the invention disclosed in U.S. application Ser. No. 239,905 which relates to an antistatic fiber containing a novel antistatic compound. The novel antistatic compound is prepared by reacting a tetrol compound, as described above, with a chain-extender compound, for example a diepoxide, a dicarboxylic acid or dialkyl ester thereof, or a diisocyanate, to form predominantly branched, chain-extended polymer having a melt viscosity of about 800 to 50,000 centipoises, preferably 1,500 to 25,000 centipoises, at 100°C. Preferably, the ethylene oxide moiety makes up 10 to 90% of the molecular weight of the antistatic compound. The mol ratio of chain-extender compound to tetrol compound is preferably between about 0.7 and 1.0.

The alkylated phenol compounds useful in the present invention are known compounds and some are commercially available. The alkylation of phenols is readily conducted with a variety of catalysts and alkylating agents; see Price, *Organic Reactions* III, 58 (1946). The preparation of 2,6-dialkylphenols by direct alkylation is relatively difficult but a procedure is furnished in *Journal of Organic Chemistry*, 21, 712 (1956). Pertinent patents include U.S. Pat. Nos. 3,285,855 and 3,330,859. The sulfur compounds of the invention may be prepared in accordance with *Chemical Abstracts*, 64, 3362C. U.S. Pat. No. 2,762,836 is also pertinent.

The tetrol compound which is chain-extended for use as an antistatic additive in this invention is fully described in U.S. Pat. No. 2,979,528 to Lundsted, assignor to Wyandotte. Suitable tetrol compounds are commercially available under the trademark Tetronic as a series of poly(oxyethylene)poly(oxypropylene) block copolymers having molecular weights from 1,650 to over 26,000. This series varies in length of poly(oxyethylene) chain and poly(oxypropylene) chain. A 3 and 4 digit code number indicates the molecular composition. When four digits are employed, the first two explain the average molecular weight of the hydrophobe (poly(oxypropylene) branches on the alkylenediamine). When three digits are used only the first number serves this purpose. The last digit of each code number represents the weight percentage of hydrophilic (poly(oxyethylene)) units to the nearest 10%. The tetrol compounds in the examples are described this way.

As diamines upon which the tetrols are based, in addition to ethylene diamine, diamines of a hydrocarbon containing 1 to 13 carbon atoms, preferably the lower alkyl diamines, where the lower alkyl radical contains 1–6 carbon atoms, can be used.

The polyepoxy coupled compounds can be prepared by the method taught in British Pat. No. 793,915, Example I. The other classes of compound can be similarly prepared, as in Example 10, in U.S. Pat. No. 3,009,884.

Typical of the acids and their esters to provide the chain extending difunctional radical are the dialkyl phthalic, isophthalic or terephthalic esters, such as dimethyl terephthalate and adipic, phthalic, terephthalic, sebacic, glutaric, pimelic, isocinchomeronic acids and their esters.

Typical of the polyepoxy compounds which provide the difunctional or divalent compounds, used to chain extend the tetrols based on diamines, are those polyepoxy compounds described in British specification No. 793,915 to Union Carbide on page 2, line 48 to line 121.

Also useful to form chain-extending divalent radicals are the aromatic or aliphatic diisocyanates, having a structure OCN—A'—NCO, where A' is defined as above.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention.

EXAMPLE 1

This example shows a method of preparing a preferred antistatic additive of the type disclosed in U.S. application Ser. No. 239,905, filed Mar. 31, 1972. The instant chain-extended polymer is prepared from a tetrol compound covered by U.S. Pat. No. 2,979,528 to Lundsted, and sold commercially as Tetronic 1504.

Three hundred grams of Tetronic 1504 (molecular weight 12,500) was placed in a three-neck flask fitted with a thermometer, stirrer, and addition funnel. The Tetronic 1504 was stirred and heated to 105°C., and 4.2 grams of dimethyl terephthalate (molecular weight 194.2) was added to the material in the flask. Agitation was continued for 3.25 hours at 200°C. after the addition was completed. Then the product was cooled to room temperature. It was a soft solid having a melt viscosity of 13,820 centipoises at 100°C., measured with the Brookfield viscometer. The viscosity of the original Tetronic 1504 was 200 centipoises at 100°C.

EXAMPLE 2

This example shows a method of preparing a preferred antistatic additive of the type disclosed in U.S. application Ser. No. 239,905, filed Mar. 31, 1972. The instant chain-extended polymer is prepared from a tetrol compound covered by U.S. Pat. No. 2,979,528 to Lundsted, and sold commercially as Tetronic 1504.

Three-hundred grams of Tetronic 1504 (molecular weight 12,500) was placed in a three-neck flask fitted with a thermometer, stirrer, and additional funnel. The Tetronic 1504 was stirred and heated to 100°C. and 5.7 grams of 4,4' methylene bis (cyclohexyl) isocyanate,

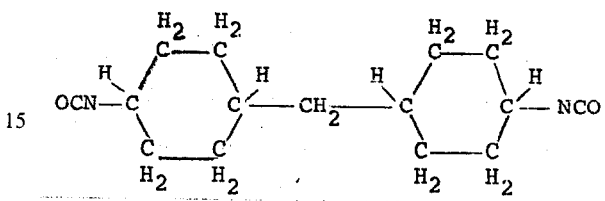

(molecular weight 262.4) was added dropwise to the material in the flask. Agitation was continued for 1 hour at 100°–105°C. after the addition was completed. Then the product was cooled to room temperature. It was a soft solid having a melt viscosity of 8,300 centipoises at 100°C. measured with the Brookfield viscometer. The viscosity of the original Tetroinic 1504 was 200 centipoises at 100°C.

EXAMPLE 3

This example shows a method of preparing a preferred antistatic additive of the type disclosed in U.S. application Ser. No. 239,905 filed Mar. 31, 1972. The instant chainextended polymer is prepared from a tetrol compound covered by U.S. Pat. No. 2,979,528 to Lundsted, and sold commercially as Tetronic 1504.

Three hundred grams of Tetronic 1504 (molecular weight 12,500) was placed in a three-neck flask fitted with a thermometer, stirrer, and addition funnel. The Tetronic 1504 was stirred and heated to 105°C., and 7.4 grams of diglycidyl ether of 2,2-bis(4-hydroxyphenyl)-propane of the structure:

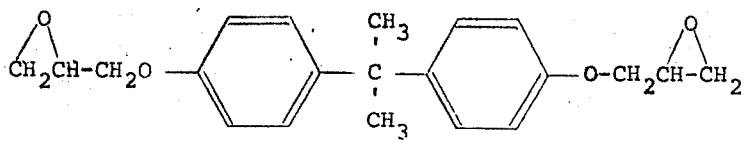

(molecular weight 340.4) was added to the material in the flask. Agitation was continued for 2.5 hours at 190°C. after the addition was completed. Then the product was cooled to room temperature. It was a soft solid having a melt viscosity of 6,000 centipoises at 100°C. measured with the Brookfield viscometer. The viscosity of the original Tetronic 1504 was 200 centipoises at 100°C.

EXAMPLE 4

A glass reactor equipped with a heater and stirrer was charged with a mixture of 1,520 grams of e-caprolactam and 80 grams of aminocaproic acid. The mixture was then flushed with nitrogen and was stirred and heated to 255°C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 2.7 grams of tetra[methylene 3-(3,',5'-di-tertiary-butyl-4'-hydroxyphenyl)propionate]methane and 90 grams of the antistatic compound of Example 1, were added to the polycaproamide and stirring was continued to thoroughly mix the additives throughout the polymer. The tetra[methylene 3-(3',5'-di-tertiary-butyl-4'-hydroxyphenyl)propionate]methane is solid commercially under the tradename Irganox 1010 and has the formula:

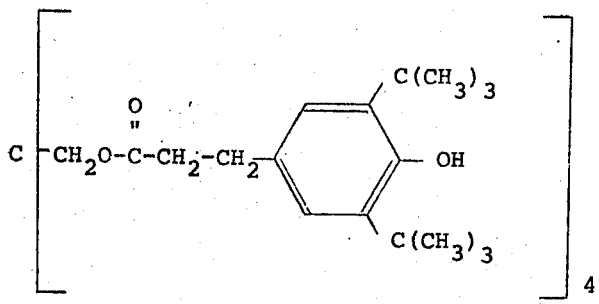

Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 to 60 as determined by a concentration of 11 grams of polymer in 100 milliliters of 90% formic acid at 25°C. (ASTMD–789–62T).

The polycaproamide pellets containing the antistatic agent and other additives were melted at about 285°C. and then melt-extruded under a pressure of about 1,500 psig through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the antistatic agent but no additional additives was produced in the same manner as described above. For convenience, this yarn hereinafter will be called Yarn B.

Yarn A and Yarn B were woven into conventional plain weave fabrics. The fabrics were cut into fabric test samples having a width of 3 inches and a length of 9 inches. The fabric samples were tested for their antistatic property in accordance with the general procedure described in the *Technical Manual of the American Association of Textile Chemists and Colorists*, 1969 edition, Volume 45, at pages 206–207. This test procedure is entitled "Electrostatic Clinging of Fabrics: Fabric to Metal Test" and is numbered AATCC 115–1969. In accordance with this electrostatic test, Yarn A and Yarn B both showed excellent antistatic properties for example, average time for fabric samples to decling from metal completely on their own was about 120 seconds after 25 wash cycles. Yarn A and Yarn B were also tested for the number of nubs per pounds as shown in Example 5.

EXAMPLE 5

This example outlines the method used for locating, dentifying and calculating the nubs per pound in Yarn A and Yarn B as prepared in Example 4. In this method a nub is defined as an enlarged place in a filament which is no more than several filament diameters in length. This method may be used for either monofilament or multifilament yarns; however, it is not applicable to most types of crimped yarn.

In accordance with the test, the 70-denier yarn is drawn directly from the package by means of an air aspirator and is passed through an opening of known width, specifically, 0.0030 inch in width. Such an opening is conveniently provided by use of a ceramic cleaner gap, which is wellknown in the art. The presence of a nub is detected when it stops the yarn passage through the opening. The filaments are separated and the cause of the yarn stopping identified as a nub or as the twisted end of a broken filament. For representative results, about 75 grams of yarn is passed through the gap and the number of nubs counted. Table I below shows the results of testing on Yarn A and Yarn B.

TABLE I

| Determination of Nubs per Pound | |
|---|---|
| Yarn Sample | Nub Count Per Pound of Yarn |
| Yarn A | 1,463 |
| Yarn B | 4,257 |

It will be noted that the addition of only antistatic compound to the polyamide caused the nub count to increase to 4,257 per pound of yarn, which is much higher than ordinary polyamide fiber. However, the addition of the antistatic compound plus the phenol compound reduced the nub count to 1,463 nubs per pound of yarn.

EXAMPLE 6

The procedure of Eample 4 (Yarn A) was followed except that 90 grams of the antistatic compound of Example 1 was added to the polycaproamide together with 2.7 grams of octadecyl-3-(3',5'-di-tertiary butyl-4'-hydroxyphenyl)propionate. The fiber produced was pale yellow and had a nub count of 1,001 nubs per pound of yarn. The octadecyl-3-(3',5'-di-tertiary butyl-40'-hydroxyphenyl)propionate is sold commercially under the trade name Irganox 1076 and has the formula:

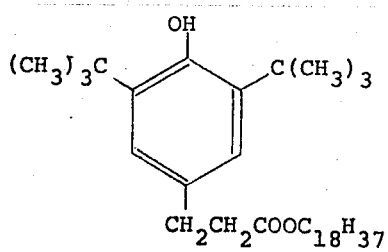

EXAMPLE 7

The procedure of Example 4 (Yarn A) was followed except that 90 grams of the antistatic additive of Example 1 was used together with 1.35 grams of tetra[methylene 3-(3',5'-di-t-buyl-4'-hydroxyphenyl)propionate]methane and 1.35 grams of distearyl thiodipropionate.

The fiber produced was pale yellow and had a nub count of 1,463 nubs per pound of yarn.

EXAMPLE 8

The procedure of Example 4 (Yarn A) was followed except that 90 grams of the antistatic additive of Example 2 was used together with 2.7 grams of tetra[methylene 3-(3',5'di-t-butyl-4'-hydroxyphenyl)propionate]methane. The fiber produced was pale yellow and had a nub count of 1,487 nubs per pound of yarn. A control yarn containing only the antistatic additive of Example 2 was produced and had a nub count of 5,362 nubs per pound of yarn.

EXAMPLE 9

The procedure of Examaple 4 (Yarn A) was followed except that 90 grams of the antistatic additive of Example 2 was used together with 2.7 grams of octadecyl-3-(3',5'-di-tertiary butyl-4'-hydroxyphenyl)propionate. The fiber produced was pale yellow and had a nub count of 982 nubs per pound of yarn.

EXAMPLE 10

The procedure of Example 4 (Yarn A) was followed except that 90 grams of the antistatic additive of Example 2 was used together with 1.35 grams of tetra[methylene 3-(3',5'-di-tertiary-butyl-4'-hydroxyphenyl)propionate]methane and 1.35 grams of distearyl thiodiproprionate. The fiber produced was pale yellow and has a nub count of 1,405 nubs per pound of yarn.

EXAMPLE 11

The procedure of Example 4 (Yarn A) was followed except that 90 grams of the antistatic additive of Example 3 was used together with 2.7 grams of tetra[methylene 3-(3',5'-di-tertiary-butyl-4'-hydroxyphenyl)propionate]methane. The fiber produced was pale yellow and had a nub count of 1,475 nubs per pound of yarn.

EXAMPLE 12

The procedure of Example 4 (Yarn A) was followed except that 90 grams of the antistatic additive of Example 3 was used together with 2.7 grams of octadecyl-3-(3',5'-di-tertiary butyl-4'-hydroxyphenyl)propionate. The fiber produced was pale yellow and had a nub count of 1,150 nubs per pound of yarn.

EXAMPLE 13

The procedure of Example 4 (Yarn A) was followed except that 90 grams of the antistatic additive of Example 3 was used together with 1.35 grams of tetra[methylene 3-(3',5'-di-tertiary-butyl-4'-hydroxyphenyl)propionate]methane and 1.35 grams of distearylthiodipropionate. The fiber produced was pale yellow and had a nub count of 1,418 nubs per pound of yarn.

EXAMPLE 14

The procedure of Example 1 was followed except that 300 grams of Tetronic 1504 was used together with 3.26 grams of dimethyl terephthalate, a molar ratio of 1 to 0.7.

The antistatic additive produced was a soft solid having a melt viscosity of 1,300 centipoises at 100°C., measured with the Brookfield viscometer.

EXAMPLE 15

The procedure of Example 1 was followed except that 300 grams of Tetronic 1504 was used together with 4.66 grams of dimethyl terephthalate, a molar ratio of 1.0.

The antistatic additive produced was a soft solid having a melt viscosity of 17,500 centipoises at 100°C., measured with the Brookfield viscometer.

EXAMPLE 16

The procedure of Example 2 was followed except that 300 grams of Tetronic 1504 was used together with 4.41 grams of the diisocyanate compound of Example 2, a molar ratio of 1 to 0.7.

The antistatic additive produced was a soft solid having a melt viscosity of 2,150 centipoises at 100°C., measured with the Brookfield viscometer.

EXAMPLE 17

The procedure of Example 2 was followed except that 300 grams of Tetronic 1504 was used together with 6.3 grams of the diisocyanate compound of Example 2, a molar ratio of 1.

The antistatic additive produced was a soft solid having a melt viscosity of 17,200 centipoises at 100°C., measured with the Brookfield viscometer.

EXAMPLE 18

The procedure of Example 4 (Yarn A) was followed except that 90 grams of the antistatic additive of Example 14 was used together with 2.7 grams of tetra[methylene 3-(3',5'-di-tertiary-butyl-4'-hydroxyphenyl)propionate]methane. The fiber produced was pale yellow and had a nub count of 2,168 nubs per pound of yarn.

A control yarn containing only the antistatic additive of Example 14 was produced and had a nub count of 6,000 nubs per pound of yarn.

This example illustrates that antistatic additives having a relatively low melt viscosity also can be effectively protected from a high nub count.

EXAMPLE 19

The procedure of Example 4 (Yarn A) was followed except that 90 grams of the antistatic additive of Example 15 was used together with 2.7 grams of tetra[methylene 3-(3',5'-di-tertiary-butyl-4'-hydroxyphenyl)propionate]methane. The fiber produced was pale yellow and had a nub count of 1,648 nubs per pound of yarn.

A control yarn containing only the antistatic additive of Example 15 was produced and had a nub count of 5,451 nubs per pound of yarn.

EXAMPLE 20

The procedure of Example 4 (Yarn A) was followed except that 90 grams of the antistatic additive of Example 17 was used together with 2.7 grams of tetra[methylene 3-(3',5'-di-tertiary-butyl-4-hydroxyphenyl)propionate]methane. The fiber produced was pale yellow and had a nub count of 2,086 nubs per pound of yarn.

A control yarn containing only the antistatic additive of Example 17 was produced and had a nub count of 5,173 nubs per pound of yarn.

EXAMPLE 21

The procedure of Example 1 was followed except that 300 grams of the Tetronic 1508 (molecular weight 27,000) was used together with 1.95 grams of dimethyl terephthalate (a molar ratio of 1 to 0.9).

The antistatic agent produced was a soft solid having a melt viscosity of 18,360 centipoises at 100°C. measured with a Brookfield viscometer. The viscosity of the original Tetronic 1508 was 6,400 centipoises at 100°C.

EXAMPLE 22

The procedure of Example 4 (Yarn A) was followed except that 90 grams of the antistatic additive of Example 21 was used together with 2.7 grams of tetra[methylene 3-(3',5'-di-tertiary-butyl-4'-hydroxyphenyl)propionate]methane. The fiber produced was pale yellow and had a nub count of 1,608 nubs per pound of yarn.

A control yarn containing only the antistatic additive of Example 21 was produced and had a nub count of 5,771 nubs per pound of yarn.

EXAMPLE 23

The procedure of Example 4 (Yarn A) was followed except that 90 grams of the antistatic additive of Example 21 was used together with 2.7 grams of octadecyl-3-(3',5'-di-tertiary butyl-4'-hydroxyphenyl)propionate. The fiber produced was pale yellow and had a nub count of 1,287 nubs per pound of yarn.

EXAMPLE 24

The procedure of Example 4 (Yarn A) was followed except that 90 grams of the antistatic additive of Example 21 was used together with 1.35 grams of tetra[methylene 3-(3',5'-di-tertiary-butyl-4'-hydroxyphenyl)propionate]methane and 1.35 grams of distearylthiodipropionate. The fiber produced was pale yellow and had a nub count of 1,563 nubs per pound of yarn.

EXAMPLE 25

The procedure of Example 4 (Yarn A) was followed except that 90 grams of the antistatic additive of Example 21 was used together with 1.35 grams of tetra[methylene 3-(3',5'-di-tertiary-butyl-4'-hydroxyphenyl)propionate]methane and 1.35 grams of dilaurylthiodipropionate. The fiber produced was pale yellow and had a nub count of 1,795 nubs per pound of yarn.

This illustrates that the dilaurylthiodipropionate was also an effective thioester which could be used with the phenol compound of the invention.

EXAMPLE 26

The procedure of Example 1 was followed except that 300 grams of Tetronic 901 (molecular weight 4,750) was used together with 11.1 grams of dimethyl terephthalate. The antistatic compound produced was a soft solid having a melt viscosity of 4,300 centipoises at 100°C., measured with the Brookfield viscometer. The viscosity of the original Tetronic 901 was 67 centipoises at 100°C.

EXAMPLE 27

The procedure of Example 4 (Yarn A) was followed except that 90 grams of the antistatic additive of Example 26 was used together with 2.7 grams tetra[methylene 3-(3',5'-di-isopropyl 4'-hydroxyphenyl)propionate]methane. The fiber produced was pale yellow and had a nub count of 1,832 nubs per pound of yarn.

A control yarn was made with only the antistatic additive of Example 26. The yarn had a nub count of 7,315 nubs per pound.

EXAMPLE 28

The procedure of Example 4 (Yarn A) was followed except that 90 grams of the antistatic additive of Example 26 was used together with 2.7 grams of octadecyl-3-(3',5'-di-isopropyl-4'-hydroxyphenyl)propionate. The fiber produced was pale yellow and had a nub count of 1,371 nubs per pound of yarn.

EXAMPLE 29

The procedure of Example 1 was followed except that 300 grams of Tetronic 1307 (molecular weight 18,600) was used together with 2.82 grams of dimethylterephthalate (a molar ratio of 1 to 0.9). The antistatic agent produced was a waxy solid having a melt viscosity of 18,700 centipoises at 100°C. The viscosity of the original Tetronic 1307 at 100°C. was 1,220 centipoises.

EXAMPLE 30

The procedure of Example 4 (Yarn A) was followed except that 90 grams of the antistatic additive of Example 29 was used together with 2.7 grams of tetra[methylene 3-(3',5'-di-tertiary-butyl-4'-hydroxyphenyl)propionate]methane. The fiber produced was pale yellow and had a nub count of 1,518 nubs per pound of yarn.

A control yarn was made with only the antistatic additive of Example 29 and no phenol compound. The yarn had a nub count of 4,560 nubs per pound of yarn.

EXAMPLE 31

The procedure of Example 4 (Yarn A) was followed except that 90 grams of the antistatic additive of Example 29 was used together with 2.7 grams of octadecyl-3-(3,',5'-di-tertiary butyl-4'-hydroxyphenyl)propionate. The fiber produced was pale yellow and had a nub count of 1,310 nubs per pound of yarn.

EXAMPLE 32

The procedure of Example 4 (Yarn A) was followed except that 90 grams of the antistatic additive of Example 29 was used together with 1.35 grams of tetra[methylene 3-(3',5'-di-tertiary-butyl-4'-hydroxyphenyl)propionate]methane and 1.35 grams of distearylthiodipropionate. The fiber produced was pale yellow and had a nub count of 1,165 nubs per pound of yarn.

EXAMPLE 33

The procedure of Example 4 (Yarn A) was followed except that 90 grams of the antistatic additive of Example 1 was used together with 0.9 gram of tetra[methylene 3-(3',5'-di-tertiary-butyl-4'-hydroxyphenyl)propionate]methane. The fiber produced was pale yellow and had a nub count of 1,950 nubs per pound of yarn.

EXAMPLE 34

The procedure of Example 4 (Yarn A) was followed except that 90 grams of the antistatic additive of Example 1 was used together with 1.8 grams of tetra[methylene 3-(3',5'-di-tertiary-butyl-4'-hydroxyphenyl)propionate]methane. The fiber produced was pale yellow and had a nub count of 1,720 nubs per pound of yarn.

EXAMPLE 35

The procedure of Example 4 (Yarn A) was followed except that 90 grams of the antistatic additive of Example 1 was used together with 3.6 grams of tetra[methylene 3-(3',5'-di-tertiary-butyl-4'-hydroxyphenyl)propionate]methane. The fiber produced was plae yellow and had a nub count of 1,275 nubs per pound of yarn.

EXAMPLE 36

The procedure of Example 4 (Yarn A) was followed except that 90 grams of the antistatic additive of Example 1 was used together with 4.5 grams of tetra[methylene 3-(3',5'-di-tertiary-butyl-4'-hydroxyphenyl)propionate]methane. The fiber produced was pale yellow and had a nub count of 1,330 nubs per pound of yarn.

EXAMPLE 37

The procedure of Example 4 (Yarn A) was followed except that 90 grams of the antistatic additive of Example 1 was used together with 5.4 grams of tetra[methylene 3-(3',5'-di-tertiary-butyl-4'-hydroxyphenyl)propionate]methane. The fiber produced was pale yellow and had a nub count of 1,682 nubs per pound of yarn.

EXAMPLE 38

The procedure of Example 4 (Yarn A) was followed except that 60 grams of the antistatic additive of Example 1 was used together with 1.8 grams of tetra[methylene 3-(3',5'-di-tertiary-butyl-4'-hydroxyphenyl)propionate]methane. The fiber produced was pale yellow and had a nub count of 1,250 nubs per pound of yarn.

A control yarn containing only the antistatic additive was produced and had a nub count of 3,780 nubs per pound of yarn.

EXAMPLE 39

The procedure of Example 4 (Yarn A) was followed except that 44 grams of the antistatic additive of Example 1 was used together with 1.32 grams of tetra[methylene 3-(3',5'-di-tertiary-butyl-4'-hydroxyphenyl)propionate]methane. The fiber produced was pale yellow and had a nub count of 1,077 nubs per pound of yarn.

A control yarn containing only the antistatic additive was produced and had a nub count of 3,518 nubs per pound of yarn.

EXAMPLE 40

The procedure of Example 4 (Yarn A) was followed except that 30 grams of the antistatic additive of Example 1 was used together with 0.9 gram of tetra[methylene 3-(3',5'-di-tertiary-butyl-4'-hydroxyphenyl)propionate]methane. The fiber produced was pale yellow and had a nub count of 851 nubs per pound of yarn.

A control yarn conttaining only the antistatic additive was produced and had a nub count of 3,265 nubs per pound of yarn.

EXAMPLE 41

The procedure of Example 4 (Yarn A) was followed except that 90 grams of the antistatic additive of Example 4 was used together with 1.35 grams of octadecyl-3-(3',5'-di-tertiary butyl-4'-hydroxyphenyl)propionate and 1.35 grams of distearylthiodipropinate. The fiber produced was pale yellow and had a nub count of 1,100 nubs per pound of yarn.

EXAMPLE 42

The procedure of Example 4 (Yarn A) was followed except that 90 grams of the antistatic additive of Example 1 was used together with 0.45 gram of tetra[methylene 3-(3',5'-di-tertiary-butyl-4'-hydroxyphenyl)propionate]methane. The fiber produced was pale yellow and had a nub count of 2,125 nubs per pound of yarn.

EXAMPLE 43

The procedure of Example 4 (Yarn A) was followed except that 90 grams of the antistatic additive of Example 1 was used together with 7.2 grams of tetra[methylene 3-(3',5'-di-tertiary-butyl-4'-hydroxyphenyl)propionate]methane. The fiber produced was pale yellow and had a nub count of 1,650 nubs per pound of yarn.

EXAMPLE 44

Polycaproamide pellets containing the antistatic agent of Example 1 and tetra[methylene 3-(3',5'-di-tertiary-butyl-4'-hydroxyphenyl)propionate]methane were prepared in accordance with the procedure of Example 4 (Yarn A). The polycaproamide pellets were melted at about 285°C. and then melt extruded under pressure of 15 psig to a 70 orifice spinnerette, each of the orifices having a diameter of 0.018 inch to produce a 4,500 denier fiber. The fiber was collected at 1,000 feet per minute and was drawn about 4 times the extruded length to produce 1,125 denier yarn. This yarn is particularly useful in the production of carpets as indicated in the following testing procedures.

The yarn was textured using a steam jet and then two-plied. This yarn was tufted into a level loop carpet at 6.5 stitch rate, 910/32 inch pile height, mock dyed and latexed. Static buildup of the carpet was tested by a "shuffle test" measuring the electrostatic voltage buildup on a person walking with a series of short shuffling steps on a piece of carpet conditioned at 70°F. at 20% relative humidity. The voltage generated was 4.8 KV.

The untextured yarn was also tested for nubs using the nub count procedure of Example 5 except that the ceramic cleaner gap used had an opening of 0.006 inch. The nub count of the yarn was 100 nubs per pound.

A control yarn made with no additives had a nub count of 85 nubs per pound, but carpet made with the control yarn generated a voltage of 14.1 KV in the above-described shuffle test.

EXAMPLE 45

The procedure of Example 44 was repeated except that the polycaproamide pellets were made with the antistatic agent of Example 1 and octadecyl-3-(3',5'-di-tertiary butyl-4'-hydroxyphenyl)propionate. The nub count of the resulting yarn was 102 nubs per pound. Carpet made with the yarn generated a voltage of 4.9 KV in the above-described shuffle test.

DISCUSSION

In additional tests it was determined that the molecular weight of the tetrol compound used to prepare the chainextended antistatic compound is preferably between about 4,000 and about 50,000, the ethylene oxide moieties making up about 10 to about 90 percent of the molecular weight of said compound. Preferably, the antistatic fiber contains from about 2 to about 8 percent of the antistatic compound.

By "antistatic" fiber is meant fibers that will passs the cling test and the shuffle test as described in U.S. Pat.

No. 3,657,386. By "fiber" is meant multifilament yarn, monofilament, and all the known physical forms of synthetic fibers. By "polyamide" is meant the polymers made by condensation of diamines with dibasic acids or by polymerization of lactams or amino acids, resulting in a synthetic resin characterized by the recurring group —CONH—. By "ethylene oxide moiety" is meant the portion of the chemical molecule —(CH₂CH₂O)—.

Desirably, the chain-extended antistatic compound and the other additives are substantially uniformly dispersed in the polyamide. Preferably, the sulfur compound is used together with the phenol compound, and the weight ratio of the phenol compound to sulfur compound is preferably between 0.25 and 4.0.

EXAMPLE 46

The procedure of Example 4 (Yarn A) was repeated except that the additives, i.e., 2.7 grams of tetra[methylene 3-(3',5'-di-tertiary-butyl 4'-hydroxyphenyl)propionate]methane and 90 grams of the antistatic compound of Example 1 were charged to the glass reactor with the e-caprolactam and aminocaproic acid. The fiber produced was pale yellow and had a nub count of 1,585 nubs per pound of yarn. Yarn prepared in a similar way containing only the antistatic additive contained 6,030 nubs per pound of yarn.

EXAMPLE 47

Procedure and additives were similar to Example 4 (Yarn A) except the polyamide was polymerized from poly (hexamethylammonium adipate salt. A fiber was produced and nubs counted as in Example 5, and the result was 1,512 nubs per pound of yarn. A second yarn, similarly prepared with the antistatic additive and no additional additive, contained 5,625 nubs per pound of yarn.

We claim:

1. In a process for the formation of an antistatic polyamide fiber from a fiber-forming polyamide polymer containing about 1 to 12 percent by weight of an antistatic compound which is a chain-extended reaction product of a tetrol compound represented by the formula:

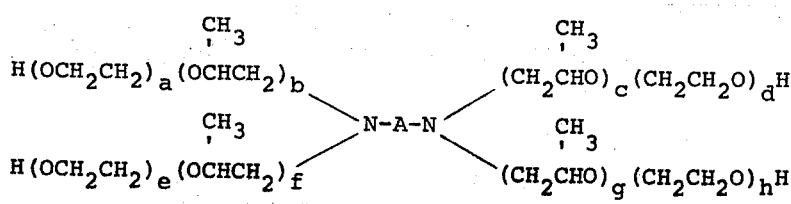

where $a, b, c, d, e, f, g$, and $h$ are each a whole number and A is a difunctional radical from a hydrocarbon containing 1 to 13 carbon atoms, said tetrol compound having a molecular weight between about 4,000 and about 50,000 and at least one compound selected from the group consisting of compounds which yield the following divalent radical:

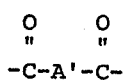

where A' is a difunctional radical from a hydrocarbon containing 1 to 30 carbon atoms, by extruding the molten polymer through an orifice into a quenching melium and thereafter stretching the resulting filaments, the improvement comprising dissolving in the extrudate prior to extrusion at least 0.1 percent by weight, based on the weight of the antistatic compound, of a phenol compound selected from the group consisting of:

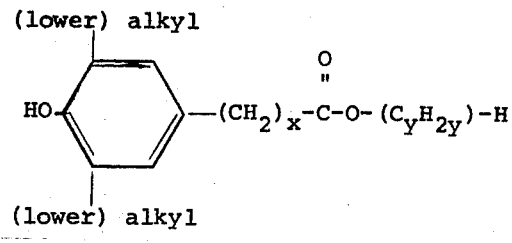

in which $x$ has a value of from 1 to 6 and $y$ has a value of from 6 to 30; and

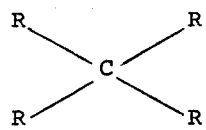

in which R is

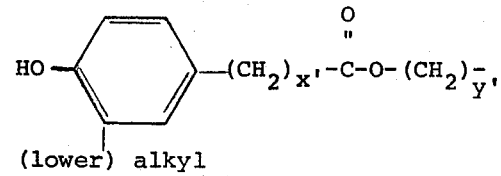

wherein $x'$ has a value from 1 to 6 and $y'$ has a value of 1 to 6.

2. The process of claim 1 wherein 0.5 to 8 percent by weight of the phenol compound is incorporated into the fiber, based on the weight of the antistatic compound.

3. The process of claim 2 additionally comrising dissolving in the extrudate prior to extrusion at least 0.1% by weight, based on the weight of the antistatic additive, of a sulfur compound of the formula:

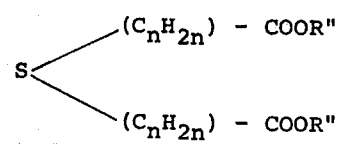

where R'' is alkyl radical containing 8 to 18 carbon atoms and $n$ is 1 to 3.

4. The process of claim 3 wherein the weight ratio of the phenol compound to the sulfur compound is between 0.25 and 4.0.

5. The process of claim 4 wherein the phenol compound is selected from the group consisting of tetra[- methylene 3-(3',5'-di-tertiary-butyl-4'-hydroxyphenyl)propionate]methane and octadecyl-3-(3',5'-di-tertiary butyl-4'-hydroxyphenyl)propionate.

6. An antistatic fiber consisting essentially of polyamide and about 1 to 12 percent by weight of an antistatic compound which is a chain-extended reaction product of a tetrol compound represented by the formula:

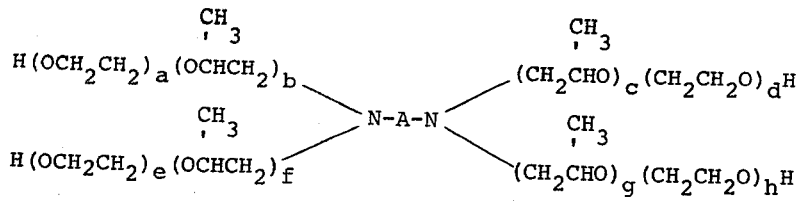

where $a, b, c, d, e, f, g$ and $h$ are each a whole number and A is a difunctional radical from a hydrocarbon containing 1 to 13 carbon atoms, said tetrol compound having a molecular weight between about 4,000 and about 50,000 and at least one compound selected from the group consisting of compounds which yield the following divalent radical:

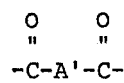

where A' is a difunctional radical from a hdyrocarbon containing 1 to 30 carbon atoms; and at least 0.1 percent by weight, based on the weight of the antistatic compound, of a phenol compound selected from the group consisting of

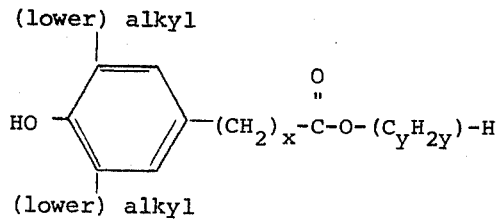

in which $x$ has a value of from 1 to 6 and $y$ has a value of from 6 to 30, and

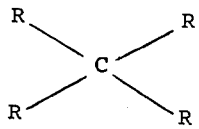

in which R is

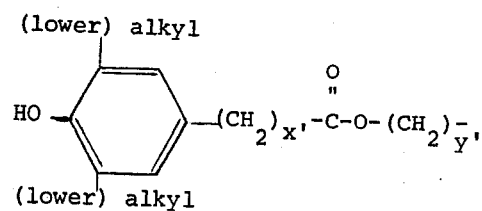

wherein $x'$ has a value from 1 to 6 and $y'$ has a value of 1 to 6.

7. The fiber of claim 6 wherein 0.5 to 8 percent by weight of the phenol compound is incorporated into the fiber based on the weight of the antistatic compound.

8. The fiber of claim 7 additionally consisting of at least 0.1% by weight, based on the weight of the antistatic additive, of a sulfur compound of the formula:

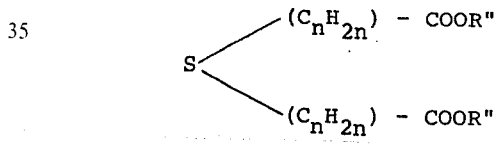

wherein R'' is an alkyl radical containing 8 to 18 carbon atoms and $n$ is 1 to 3.

9. The fiber of claim 8, wherein the weight ratio of the phenol compound to the sulfur compound is between 0.25 and 4.0.

10. The fiber of claim 9 wherein the phenol compound is selected from the group consisting of tetra[methylene 3-(3', 5'-di-tertiary-butyl-4'-hydroxyphenyl)propionate]methane and octadecyl-3-(3',5'-ditertiary butyl-4'-hydroxyphenyl) propionate.

* * * * *

UNITED STATES PATENT AND TRADEMARK OFFICE
CERTIFICATE OF CORRECTION

PATENT NO. : 3,873,639
DATED : March 25, 1975
INVENTOR(S) : Lamberto Crescentini and Rodney Lee Wells It is certified that error appears in the above-identified patent and that said Letters Patent are hereby corrected as shown below:

Column 1, line 27, "oxideethylene" should read --oxide-ethylene--.

Column 1, line 65, "selections" should read --sections--.

Column 1, line 66, "dimeters" should read --diameters--.

Column 6, line 7, "additional" should read --addition--.

Column 6, line 32, "chainextended" should read --chain-extended--.

Column 8, line 10, "wellknown" should read --well-known--.

Column 14, line 35, "910/32" should read --9-10/32--.

Signed and Sealed this eighteenth Day of November 1975

[SEAL]

Attest:

RUTH C. MASON
Attesting Officer

C. MARSHALL DANN
Commissioner of Patents and Trademarks